Jan. 4, 1955  W. L. HARKESS  2,698,559
APPARATUS FOR SETTING UP CARTONS
Filed Aug. 28, 1948  12 Sheets-Sheet 2

INVENTOR.
William L. Harkess
BY
Soans, Pond & Anderson
Attys.

Jan. 4, 1955

W. L. HARKESS 2,698,559

APPARATUS FOR SETTING UP CARTONS

Filed Aug. 28, 1948

INVENTOR.
William L. Harkess
BY
Soans, Pond & Anderson
attys.

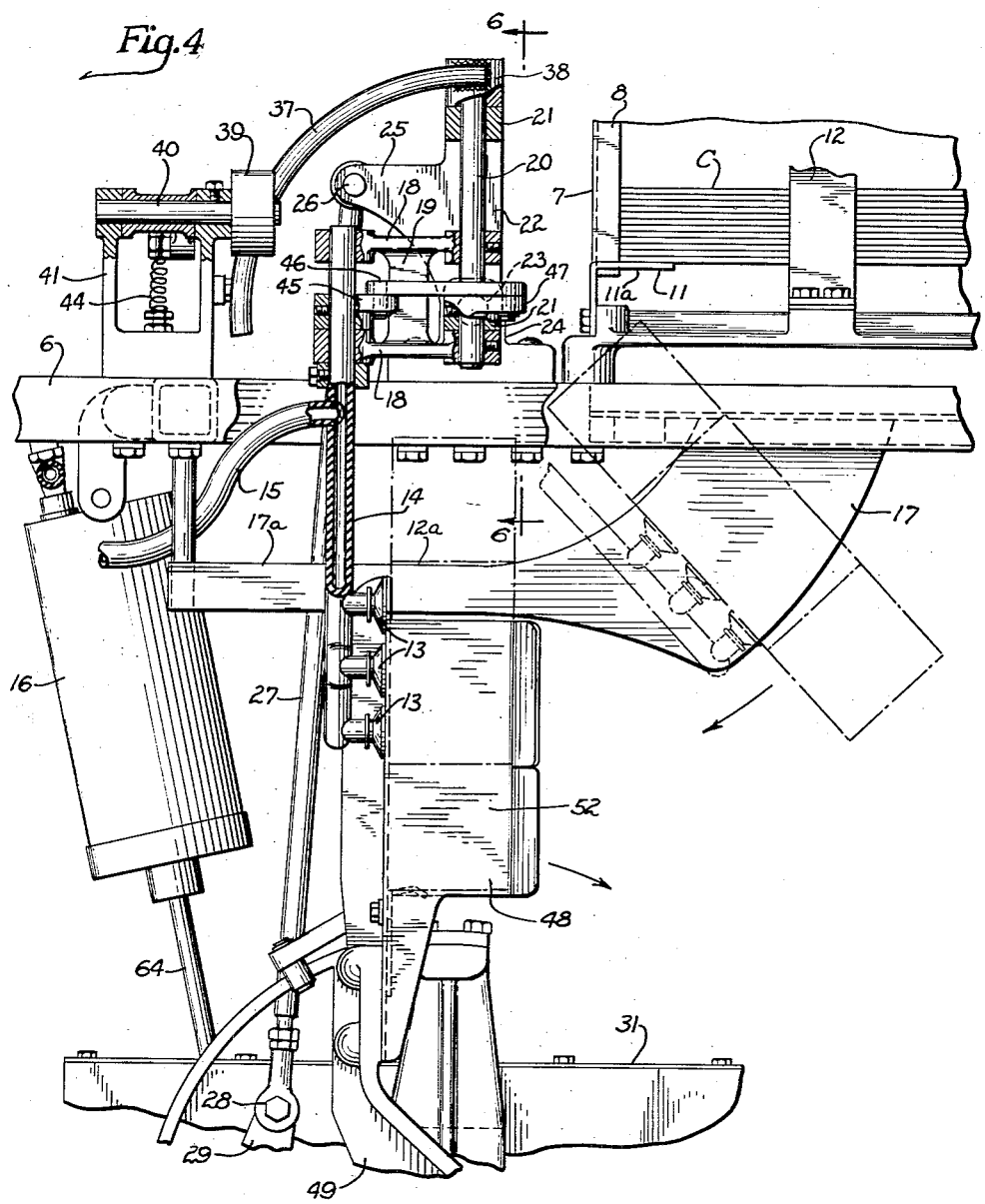

Jan. 4, 1955 W. L. HARKESS 2,698,559
APPARATUS FOR SETTING UP CARTONS
Filed Aug. 28, 1948 12 Sheets-Sheet 5
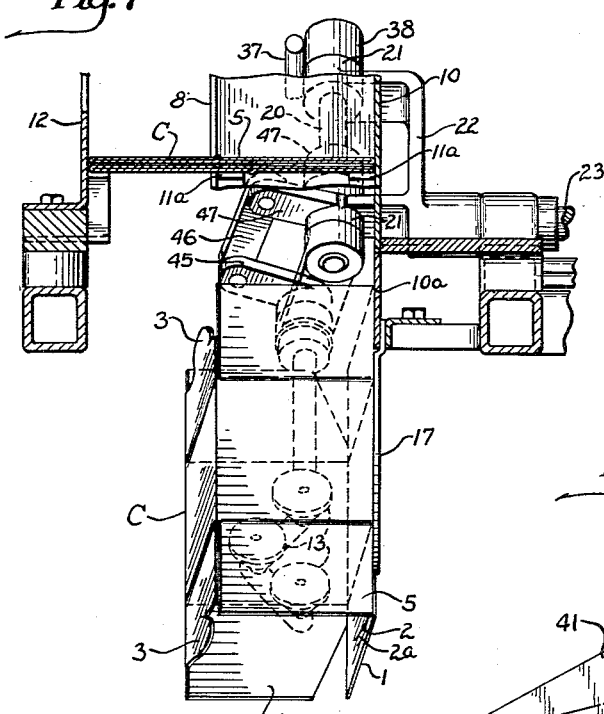
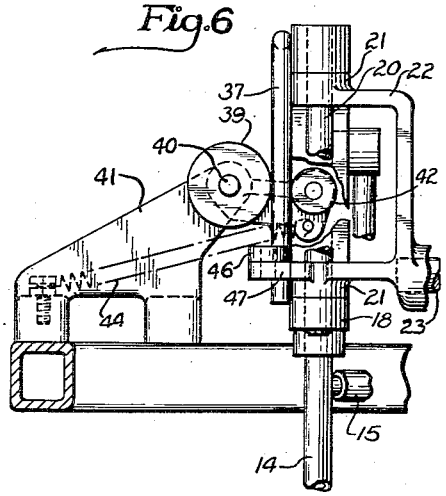
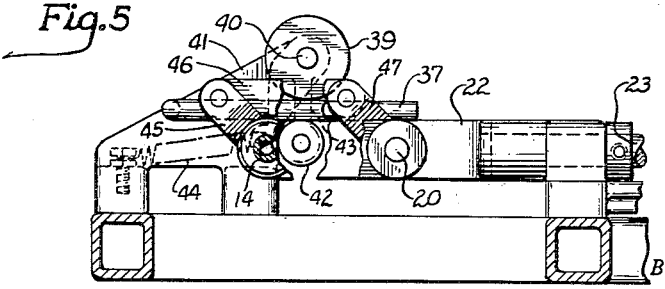
INVENTOR.
William L. Harkess
BY
Soans, Pond & Anderson
Attys.

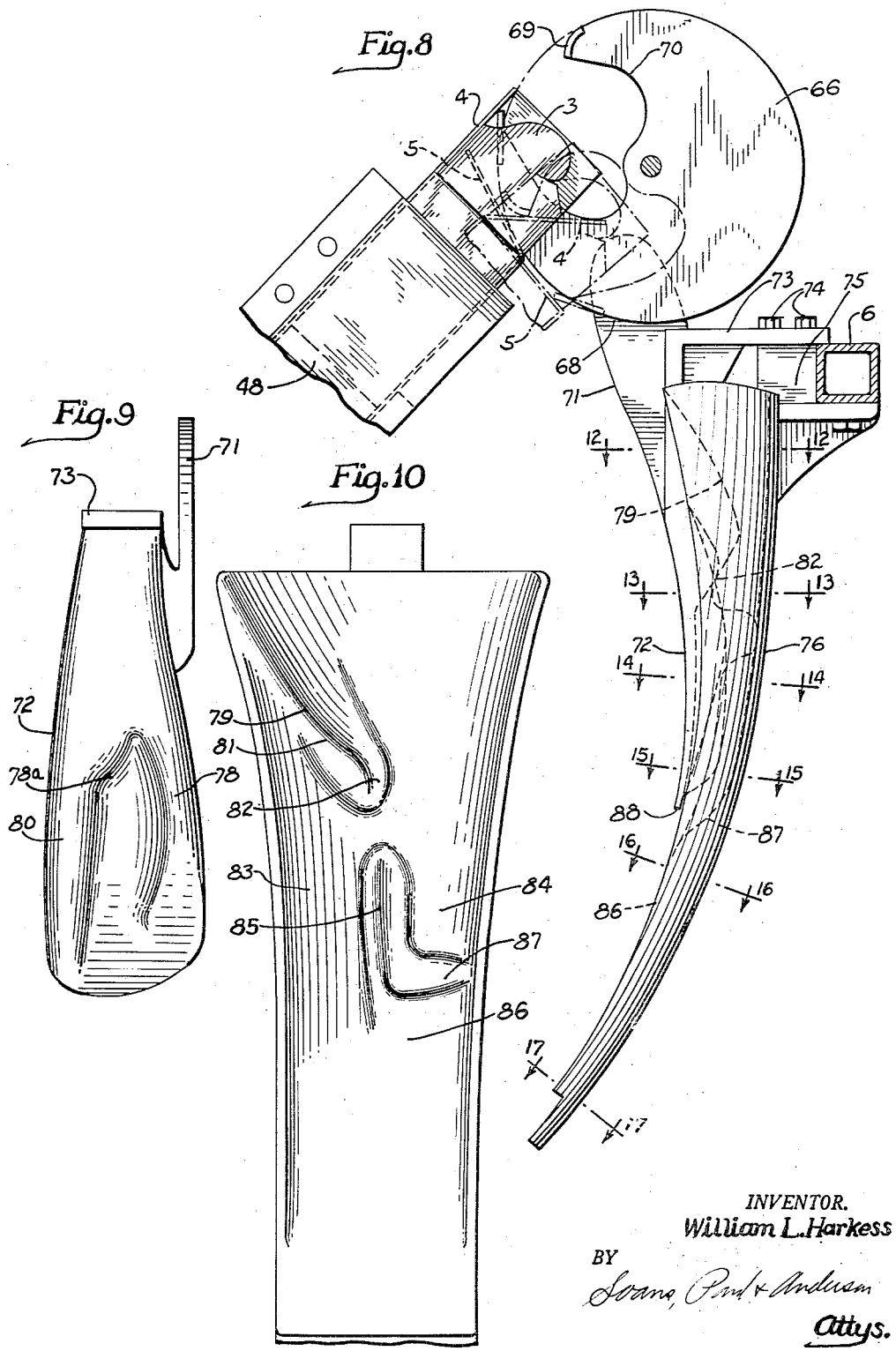

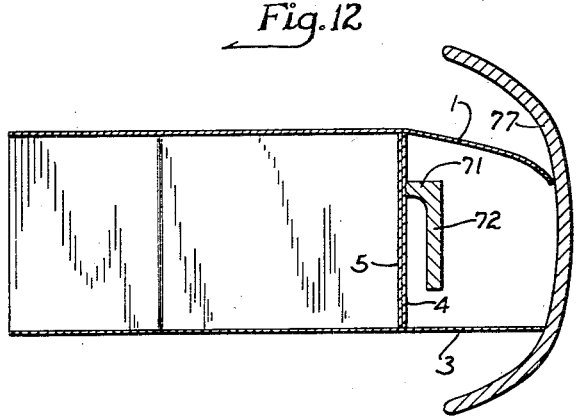
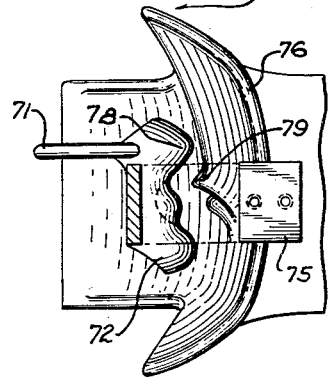
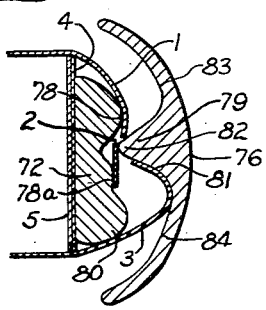
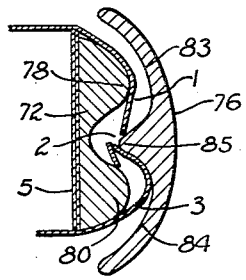
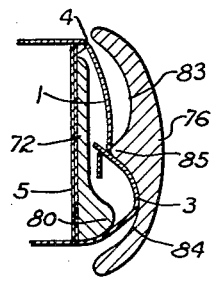
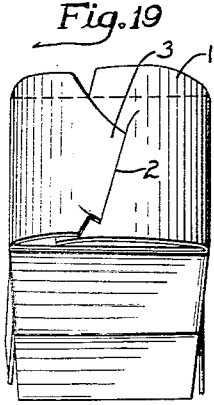
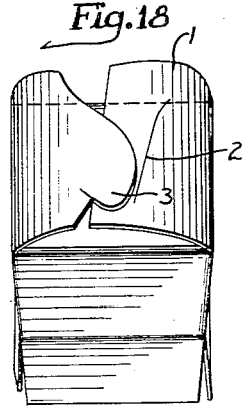
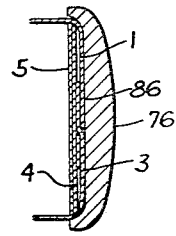
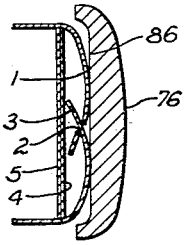

Jan. 4, 1955 W. L. HARKESS 2,698,559
APPARATUS FOR SETTING UP CARTONS
Filed Aug. 28, 1948 12 Sheets-Sheet 8
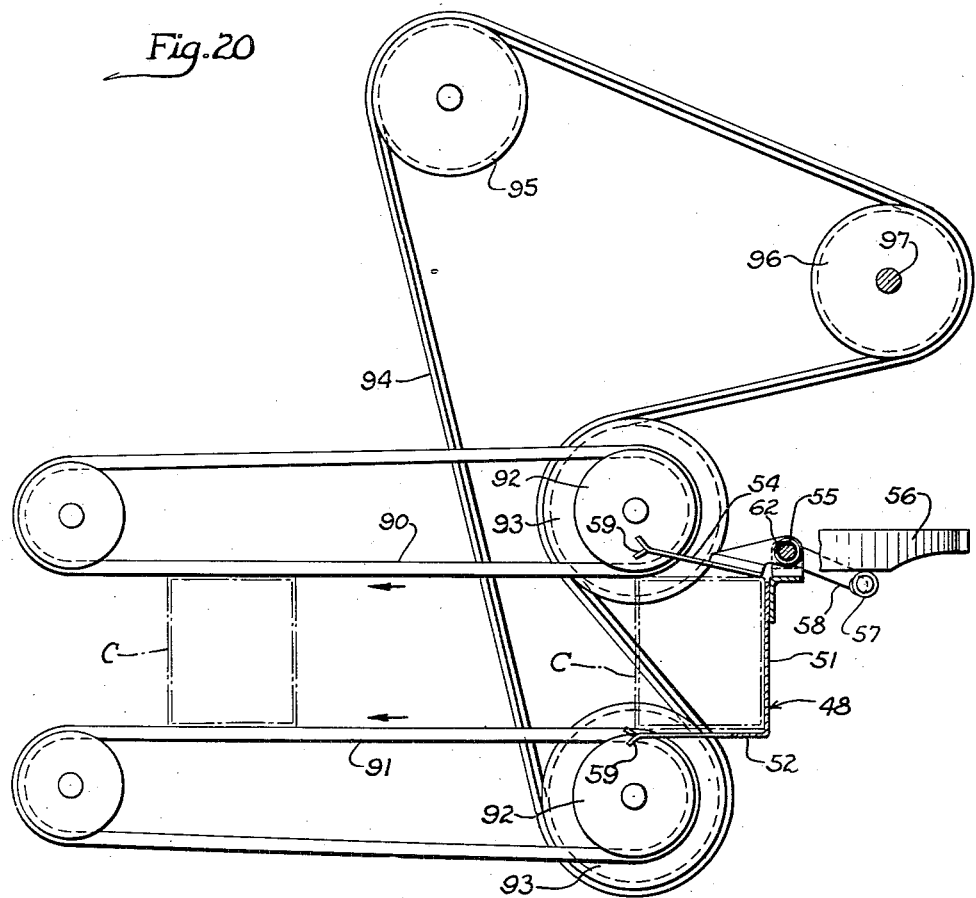
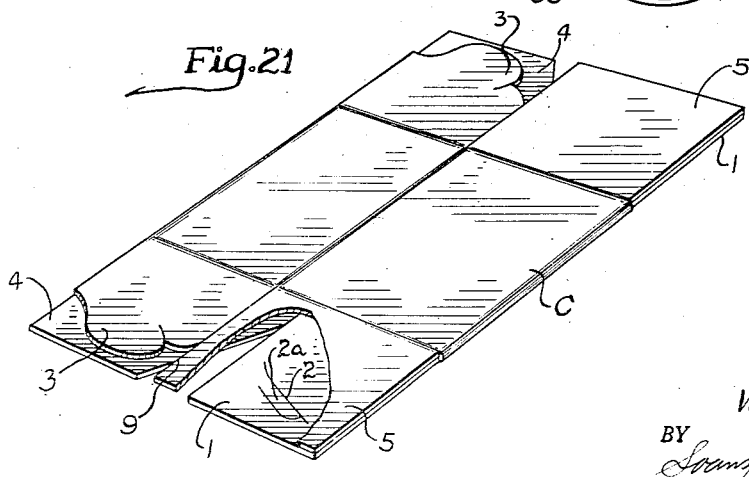
INVENTOR.
William L. Harkess
BY
Soans, Pond + Anderson
attys.

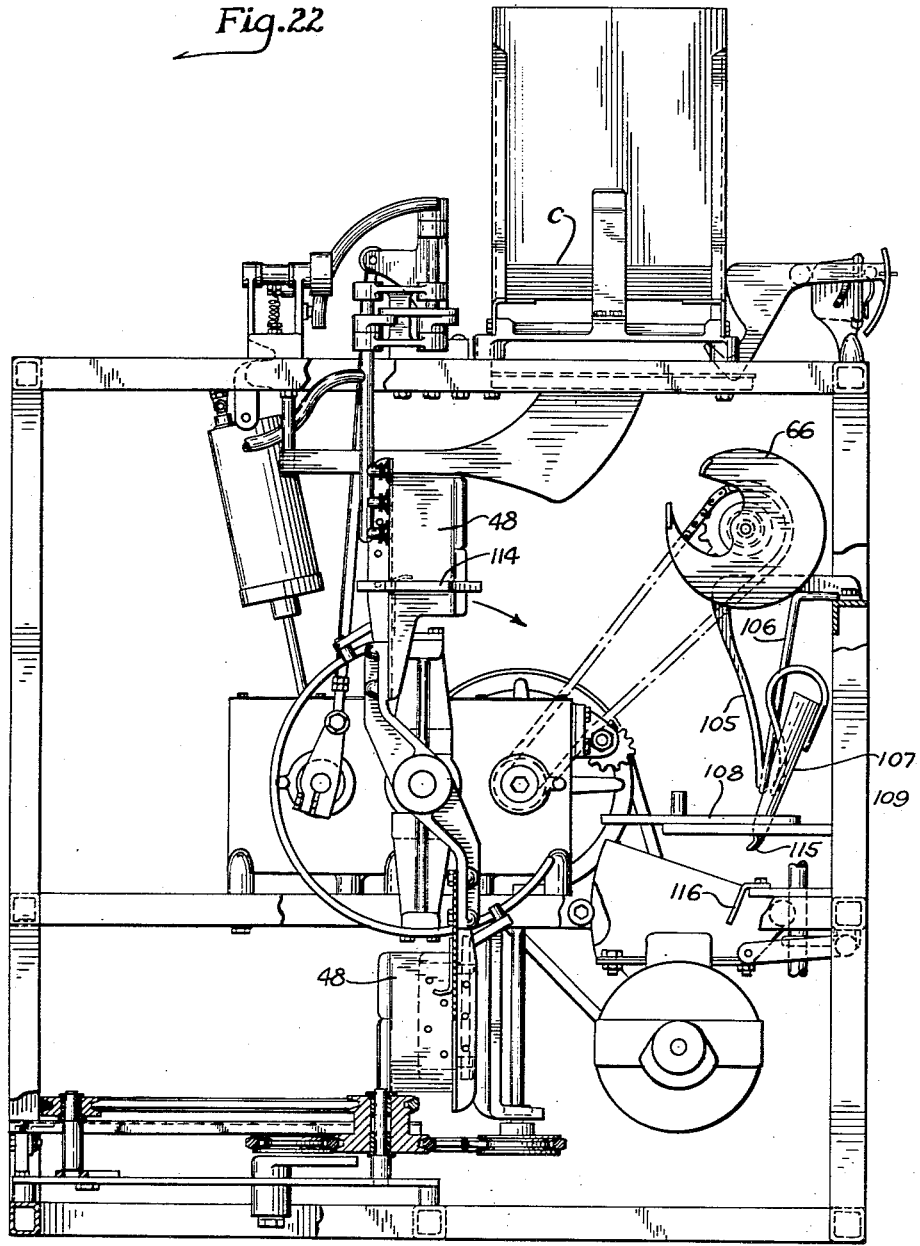

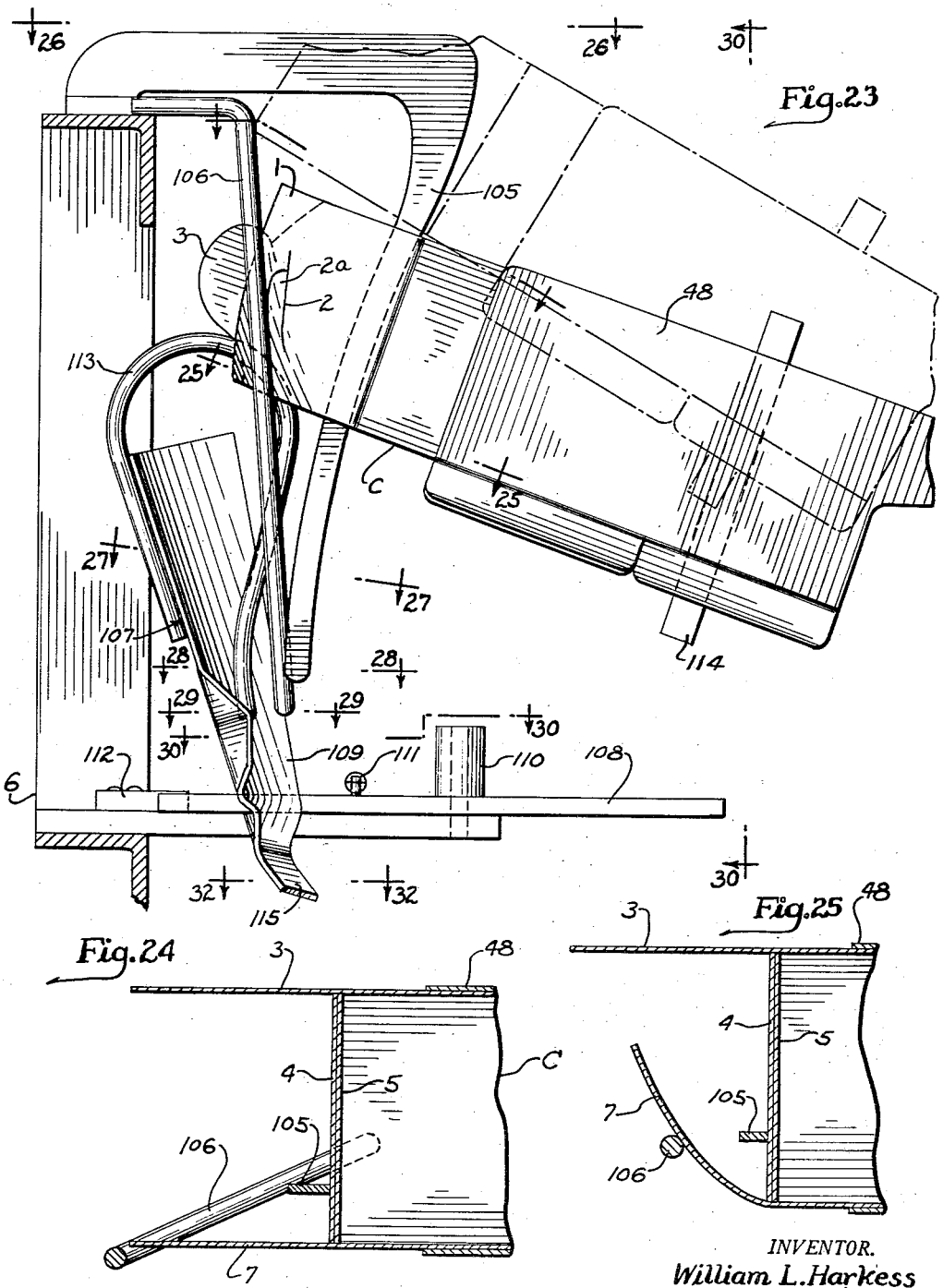

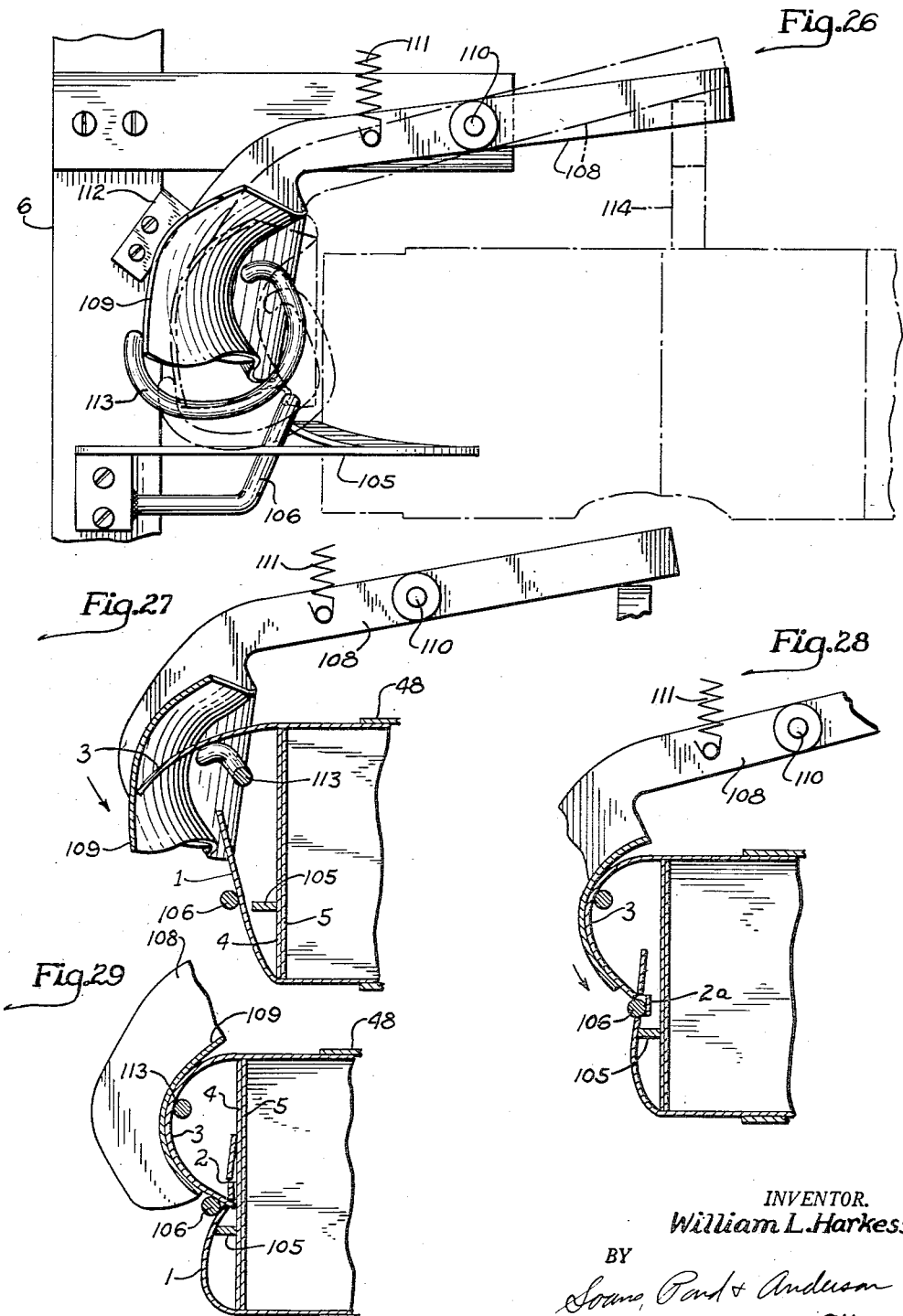

Jan. 4, 1955   W. L. HARKESS   2,698,559
APPARATUS FOR SETTING UP CARTONS
Filed Aug. 28, 1948   12 Sheets-Sheet 12
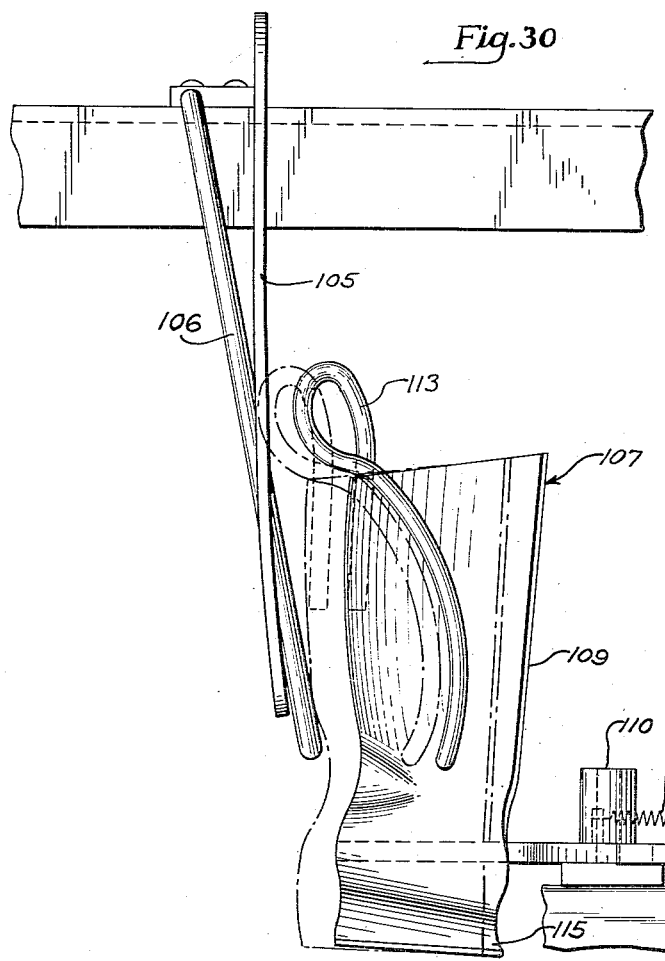
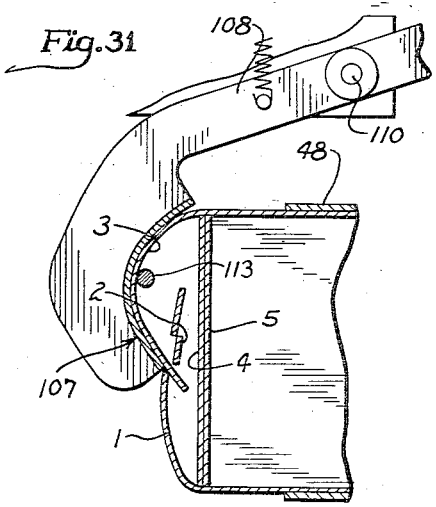
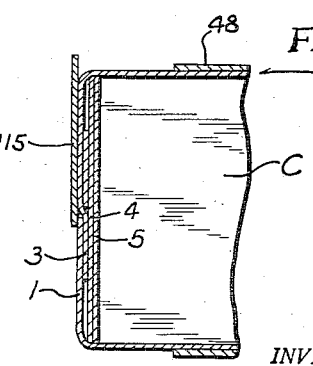
INVENTOR.
William L. Harkess
BY
Attys.

United States Patent Office 2,698,559
Patented Jan. 4, 1955

2,698,559
APPARATUS FOR SETTING UP CARTONS

William L. Harkess, Chicago, Ill., assignor, by mesne assignments, to Package Machinery Company, East Longmeadow, Mass., a corporation of Massachusetts Application August 28, 1948, Serial No. 46,657

16 Claims. (Cl. 93—53)

This invention relates to apparatus for setting up cartons, that is to say to apparatus for distending a flattened or collapsed tubular carton and closing flaps which extend from one end of the body walls to form an end closure for the carton. The invention further relates to a machine particularly concerned with the setting up of collapsed cartons in which the end closure flaps embody a slit flap and a flap having a tongue which is to be inserted through the slit flap for locking the flaps in end closing position.

The main objects of the invention are to provide apparatus which will automatically withdraw collapsed cartons one by one from a supply thereof and automatically distend the same and close the flaps at one end and then discharge the set up carton with one end remaining open, the carton being then in condition to be filled; to provide such apparatus which will operate continuously and at high speed and which will unerringly insert tongues into slits to effect locking of the end walls in closed condition; to provide such apparatus which is relatively simple and which may be constructed at a cost which will permit the apparatus to be sold to and employed by ice cream and other food processors and manufacturers whose volume of business is not large enough to require very expensive, completely automatic equipment for opening, filling and closing containers, but whose volume of business is such that some automatic equipment is desirable if not essential to economic conduct of the business.

In general, it is the object of the invention to provide improved carton distending and end closing mechanism of the character indicated and other objects and advantages of the invention will be understood by reference to the following specification and accompanying drawings (12 sheets) wherein there is illustrated apparatus of the character above indicated embodying two selected forms of the invention.

In the drawings:

Figs. 3 and 4 are fragmentary sections illustrating certain portions of the mechanism shown in Fig. 2 but on an enlarged scale, the parts being shown in changed positions in these two figures;

Fig. 5 is a section on the line 5—5 of Fig. 3;

Fig. 6 is a section on the line 6—6 of Fig. 4;

Fig. 7 is a view corresponding to Figs. 5 and 6 but showing the parts in an intermediate position;

Fig. 8 is an enlargement of certain portions of the mechanism appearing also in Fig. 2 and showing certain details of operation;

Figs. 9 and 10 are elevational views of two parts which, when assembled together, cooperate to effect insertion of the flap tongues through the slit tongues;

Fig. 11 is a top end view of the tongue inserting mechanism illustrated in Fig. 8;

Figure 1:
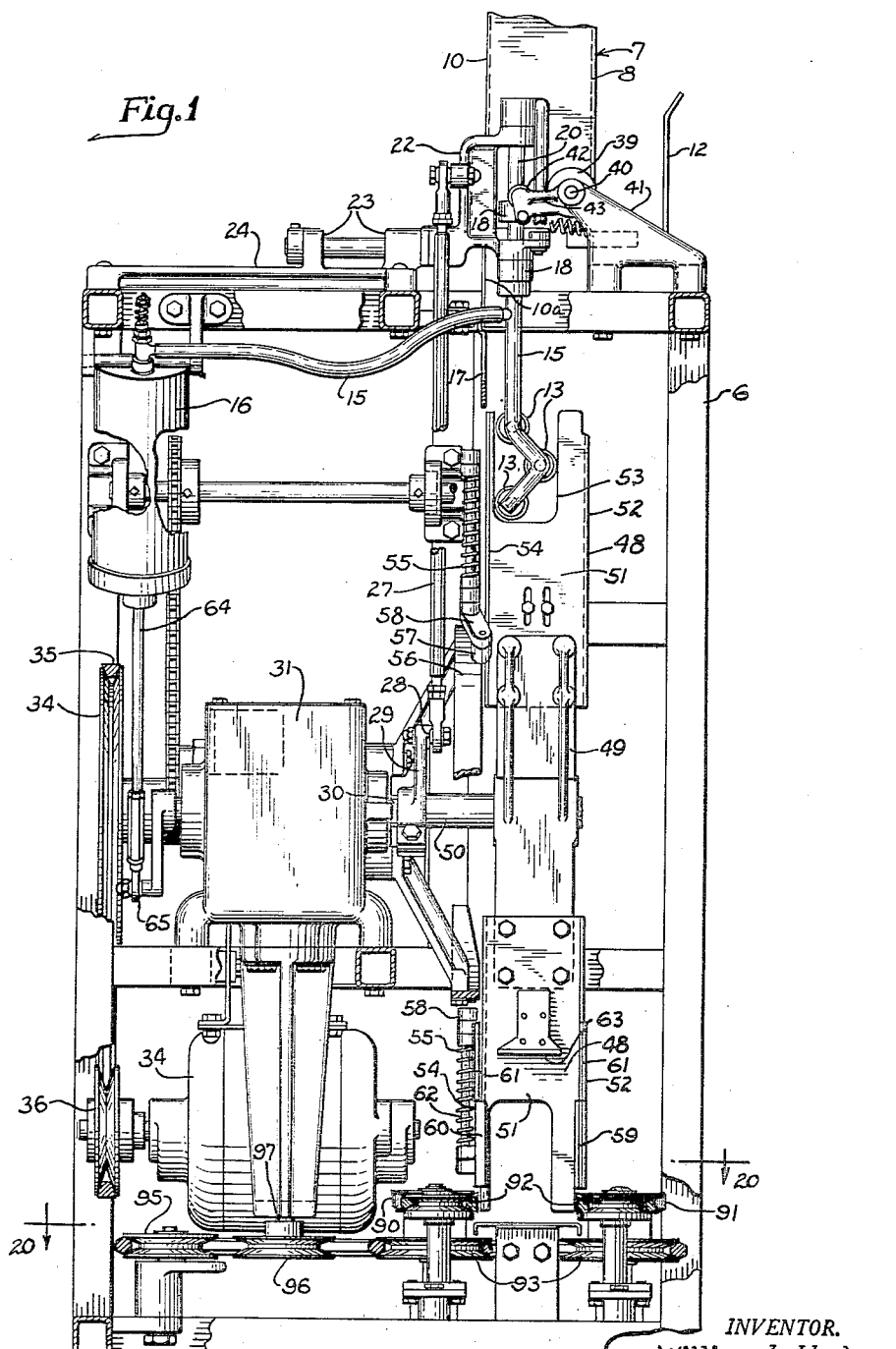
Fig. 1 is an end elevation.
Figure 2:
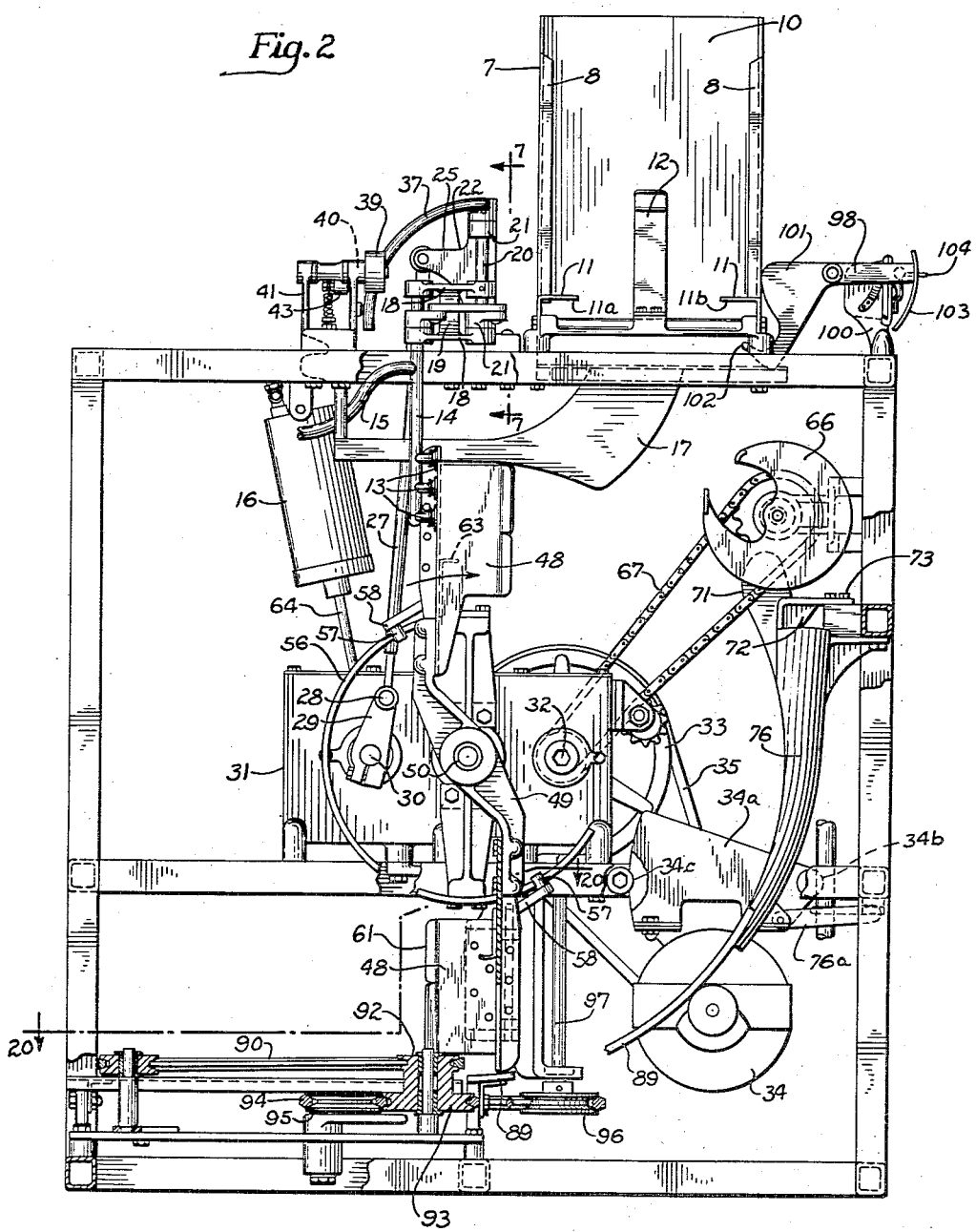
Fig. 2 is an elevation of the right-hand side of the mechanism as seen in Fig. 1.

Figs. 12 to 17 inclusive are respectively sections on the lines 12 to 17 inclusive on Fig. 8 showing successive operating portions of the flap interlocking mechanism;

Fig. 18 is a perspective illustrating the condition of the tongued and slit flaps about to be interlocked as also represented in Fig. 14;

Fig. 19 is a perspective illustrating the condition of the carton with the tongued and slit flaps interlocked in the condition also illustrated in Fig. 16;

Fig. 20 is a plan section on approximately the line 20—20 of Figs. 1 and 2;

Fig. 21 is a perspective illustration of the type of collapsed carton which the apparatus sets up preparatory to filling;

Fig. 22 is a side elevation similar to Fig. 2 but showing a modified arrangement, and Figs. 23 to 32 are sectional views respectively on the correspondingly numbered lines appearing on Fig. 23.

The ice cream, butter, lard and other industries use large numbers of cartons which are supplied by carton makers in the collapsed form shown in Fig. 21. Such cartons embody four side wall panels foldably interconnected so that they may be unfolded into rectangular tubular form. At the ends of each side wall panel there are provided flaps designed to be folded inwardly over the respective ends of the tubular body to close the same. The containers which the present machine sets up are those in which the end flaps include one end flap 1 which is provided with slits such as represented at 2, and another opposed end flap is provided with a tongue 3 which is to be inserted through the slitting 2 to lock the end flaps in closed end wall forming position. The slit and tongued flaps are, of course, folded into end wall position after the other pair of flaps represented at 4 and 5 are first folded into end wall position so that the tongued and slit flaps are on the outside and when interlocked, serve to hold the other flaps closed.

The apparatus comprises a main frame structure 5 which is of generally rectangular form and which may be formed of angle iron, tubing or otherwise as may be preferred. In this instance, it is shown as being formed of rectangular tubing, the various frame members being preferably welded together where they intersect one another to the end that a very rigid frame be produced.

On the top of the frame there is provided a magazine 7 for receiving and holding a stack of collapsed cartons C of the character shown in Fig. 21, said magazine consisting of suitable upright walls properly spaced to form an enclosure for a stack of the said collapsed cartons disposed horizontally. One side of the magazine is formed by narrow inturned flanges or ledges 8, 8 (see Figs. 2, 3, and 7) which are adapted to engage edge portions such as represented at 9 (Fig. 21) of the flaps 5 to cooperate with the back wall 10 for guiding the carton bodies. The blanks rest on shelves or ledges 11 extending inwardly from opposite sides so as to underlie the flap ends of the collapsed cartons. A centrally disposed upstanding finger 12 may be provided for cooperating with the ledges 8 and the opposite wall 10 to guide the carton bodies. The supply of cartons in the magazine is, of course, open to visual inspection at all times with the described magazine construction.

Collapsed cartons are withdrawn one by one from the bottom of the magazine by means of a series of vacuum grippers 13 which are carried by the lower or free end of a tubular arm 14. The arm 14 is closed at its ends and has connected to it a flexible tube 15 which communicates with a vacuum pump 16 forming part of the mechanism.

Figure 3:
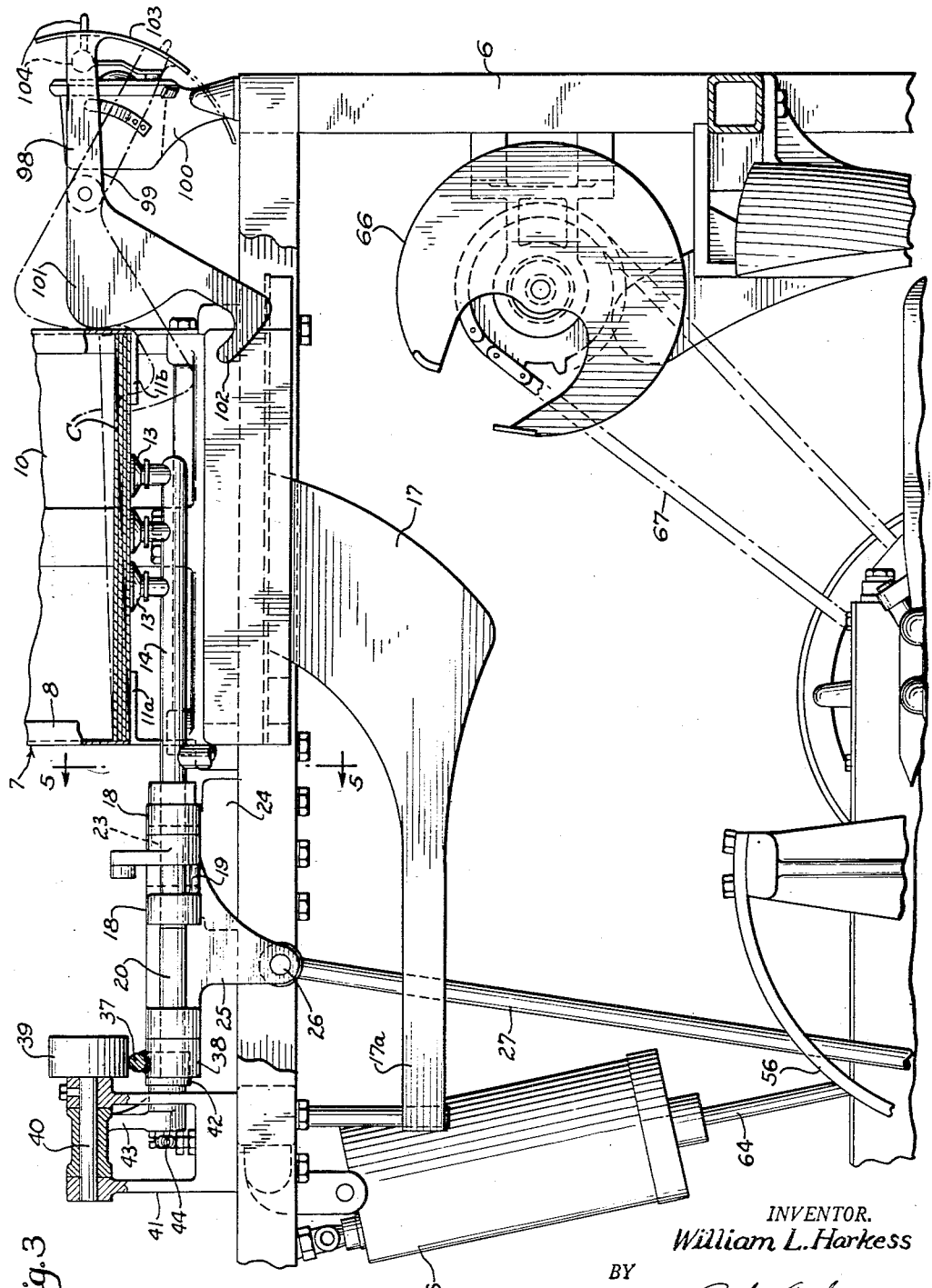

The grippers 13 grip the lowermost wall of the carton which is adjacent the magazine guide element 12, carry the carton downwardly along an extension 10a (Figs. 1 and 7) of the magazine wall 10 and along a guide plate 17 which is suitably mounted on the frame structure in continuation of the plane of the magazine wall 10 (see Figs. 2 and 3). During the movement of the carton body downwardly from its horizontal position, as shown in Fig. 3, the gripped wall of the carton is also moved laterally toward the guide plate 17 so as to thereby distend the carton. Therefore, while the vacuum grippers 13 are swung downwardly, they are also moved laterally while maintaining them in a constant planar position.

For rocking the grippers 13 from a horizontal carton gripping position, as represented in Fig. 3, to a vertical position (as shown in Fig. 4) in which a distended carton is discharged, and for effecting the aforesaid lateral shifting of the grippers, said grippers are mounted and actuated as follows:

The gripper arm 14 is rotatably mounted in the free ends of a pair of arms 18, 18 (Fig. 2) which are rigidly or integrally interconnected by a web 19. These arms 18 are secured at their opposite ends to a short shaft 20 which is journaled in bearing bosses 21, 21 which are integral with an arm 22. The arm 22 is pivoted as indicated at 23 (Figs. 1, 3 and 4) on a suitable bracket 24 mounted on the top frame portion of the machine.

The arm 22 has another edgewise extending arm or leg 25 to which is pivoted, as indicated at 26, one end of a connecting rod 27 which has its other end pivoted as shown at 28 (Figs. 1 and 4), to the free end of a crank arm 29. The crank arm 29 is secured to a driven shaft 30 which projects from a gear box 31 which contains speed control gearing driven from a shaft 32 (Fig. 2) at the other end of the box. Said shaft 32 has a pulley 33 secured to it and it is driven by means of an electric motor 34 through a belt 35 which engages said gear box pulley 34 and a pulley 36 on the motor shaft.

It will be seen that incident to rotation of the crank 29, the arm 22 will be rocked from the horizontal position shown in Fig. 3 to the upwardly extending position shown in Figs. 2 and 4, the travel of the arm being through an arc of approximately 90°. The oscillating movement of the arm 22 is at a constant rate and it is continuous. Because of the mounting of the gripper tube 14 on the oscillated arm 22 (through the agency of the double link 18 and the shaft 20) said gripper tube and grippers will be correspondingly oscillated through an arc of approximately 90° between the horizontal position shown in Fig. 3 and the vertical position shown in Figs. 2 and 4.

While the gripper arm 14 is being rocked about the pivot axis 23, it is also being shifted laterally in an arc about the axis of the shaft 20. This is effected (see Figs. 2 to 7) by rocking the shaft 20 through the agency of a curved rod member 37 which is welded to a collar 38 secured to one end of the shaft 20. Said curved rod 37 is movable between a roller 39 journaled on a pintle 40 which is held in fixed position in a bracket 41 mounted on the top of the frame, and a smaller roller 42 which is journaled on the end of an arm 43 which is pivoted on the pintle 40 as best shown in Fig. 3. A spring 44 is stretched between a portion of said arm 43 and an anchoring pin secured to a portion of the bracket 41.

By reference to Fig. 5 it will be seen that when the bracket 22 is rocked about the axis of its pivot shaft 23, the shaft 20 which is carried by said bracket will also rock about said pivot axis 23 carrying with it the curved rod 37. From the position shown in Fig. 5 the curved rod 37 will be elevated to the extent permitted by the overlying roller 39 and controlling roller 42. Thus it will be seen that incident to such rocking of the bracket 22 about the pivot axis 23, the rod 37 will be deflected downwardly about the axis of the shaft 20. The roller 39 is so located that when the bracket 22 has reached its vertical position as shown in Fig. 6, the rod 37 will have been deflected to a vertical position whereby the shaft 20 will have been rotated through an arc of substantially 90° from its initial horizontal position as shown in Fig. 5 to its final vertical position as shown in Fig. 6.

Since the shaft 20 carries the gripper tube 14 through the agency of the double link 18, the latter being pinned or keyed to the shaft 20, the gripper tube and grippers will have been moved laterally from a position spaced horizontally from the shaft 20 as shown in Fig. 5 to an aligned position rearwardly of said shaft as viewed in Fig. 6.

For the purpose of this mechanism, it is necessary to move the gripped wall of the carton body while maintaining the wall constantly in the illustrated planar position. To accomplish this purpose, the gripper tube 14 has secured to it a short lever arm 45 which is connected by means of a link 46 to a short lever arm 47 which is formed integrally with one of the bearing ears 21 for said shaft 20. This link connection with the stationary arm 47 together with the arm 45 constitutes a parallel motion device which maintains the grippers in the required plane while being revolved about the axis of the shaft 20. Hence the grippers 13 will at all times hold the gripped container wall in the required position.

The above described rotation of the gripper about the axis of the shaft 20 occurs during about the first one-quarter of the movement of the gripper from the horizontal position shown in Fig. 3 to the vertical position shown in Fig. 4.

During such initial portion of the travel of the grippers the carton body flaps 1 which underlie the flaps 5, are first pulled down past the supports 11 of the magazine and the flaps 5 remain in engagement with the supporting shelves (11a (Fig. 2) at one side of the magazine and 11b at the opposite side) until they become disengaged therefrom at about the time of completion of said initial portion of the movement. These supporting shelves 11a and 11b and similar supports carried by the back wall 10 of the magazine support the carton blank through the agency of its wide end flaps 5 until the rotation of the gripper tube 14 has progressed to such an extent that the carton body C is almost completely opened. Such opening is effected by reason of the movement of the grippers 13 and the gripped wall of the carton toward the guide plate 17 which prevents corresponding movement of the carton body as a whole as can be understood from an inspection of Fig. 7 in which the parts are shown in a position corresponding to the dotted line position of Fig. 4.

The guide 17 has an extension 17a which serves, in cooperation with the grippers 13, to maintain the carton in its distended condition for delivery in that condition to one of a pair of shoes carried by the opposite ends of an arm 49 which is secured to a shaft 50 which projects from the gear box 31. Said shaft 50 is driven at a predetermined rate of speed which is properly synchronized with the speed of the shaft 30 and travel of the grippers 13 to cause one of the shoes 48 to be in carton receiving position substantially in registry with the grippers 13 when in delivery position as shown in Figs. 1, 2 and 4. The grippers are so oscillated as to deliver a distended carton body to each shoe or bucket 48 each time such shoe or bucket is brought to its receiving position approximately vertically above the shaft 50 as shown in said Figs. 1, 2 and 4.

The shoes 48 are of sheet metal construction, each having a bottom wall 51 and a side wall 52, the bottom wall and said side wall 52 being rigidly interconnected and preferably formed by bending a single piece of sheet metal. The bottom 51 has its outer end recessed as indicated at 53 to permit the shoe to pass the gripper structure when the latter is in its vertical carton delivery position as shown in Figs. 1, 2 and 4, it being understood that the buckets travel clockwise around the axis of the shaft 50 as viewed in Figs. 2 and 4. Each bucket also has a side wall 54 (see Figs. 1 and 20) which is hinged as shown in 55 near its rear edge to the back wall of the bucket so as to be capable of opening and closing movement relative to its opposite fixed side wall 52.

Opening and closing of the pivoted side wall 54 is controlled by means of a stationary circular or segmental cam 56 which is suitably mounted in the structure and which acts against cam following rollers, such as shown at 57 carried by arms 58 which are rigid with the hinge pins 55.

The side wall 52 of each bucket has an outer marginal portion offset inwardly as indicated at 59 to cooperate with a similarly inwardly offset marginal portion 60 of the hinged wall to more effectively hold a carton in place against the back wall 51. The innermost marginal portions may be flared outwardly somewhat as indicated at 61 to assist entrance of a distended carton when the hinged wall is in its open position as illustrated in Fig. 20. A torsion spring 62 coiled around pin 55 for the wall 54 and anchored at its ends to fixed and pivoted parts respectively normally urges the hinged wall 54 to swing towards its closed position and to maintain its cam following roller 57 in operative engagement with the cam 56.

When each bucket 48 reaches its upper or carton receiving position as shown in Figs. 2 and 4, the hinged wall 54 thereof is held open by the cam 56. As soon as the bucket advances slightly so as to disengage the carton from the grippers 13, a relieved or recessed portion of the cam 56 permits said wall 54 to close to thereby cooperate with the fixed wall 59 to effectively grip the carton. Stops such as indicated at 63 are adjustably mounted on the bottoms of the buckets to prevent endwise displacement of the cartons through the buckets incident to endwise forces applied to the cartons by end flap closing instrumentalities which will presently be described.

When the grippers 13 approach their horizontal carton gripping position as shown in Fig. 3, the piston of the vacuum cup 16 begins its downward or suction producing movement so that by the time the grippers are brought into engagement with the lowermost carton body an adequate degree of vacuum or suction will exist in the suction cups to effectively grip the engaged carton body. The piston 64 of the vacuum pump 16 is actuated by being connected to a crank pin 65 carried by a crank arm on end of the shaft 30 on the side of the gear box 31 opposite to the side on which the carton feed crank 29 is located. When the grippers 13 have carried the carton to the position in which it is transferred to one of the shoes on the rotary arm 49, the suction stroke of the pump 16 is ended and the suction relieved so as to release the carton from the grippers to freely permit the carton to be thenceforth carried forwardly by the shoe 48 to which it has been delivered.

The shoe 48 shown in full lines in Fig. 4, is in substantially the position in which a distended carton begins to be advanced by the shoe 48, i. e. to the right or clockwise about the shaft 50 after having been initially moved downwardly and toward the left by the grippers 13. The flaps of the carton which extend from the upper end thereof as it is held in the shoe 48 are next folded and locked as an incident to the travel of the cartons to a position substantially 180° beyond the position shown in Fig. 4 in which the cartons are discharged from the shoes.

The first folding operation is effected by means of a rotary folder 66 which is rotatably supported in suitable frame carried brackets and which is driven by any suitable drive, such as a chain drive 67 from the driving mechanism 31.

The leading upstanding flap 5 (see Fig. 8) will first be folded rearwardly over the end of the carton by its engagement with a periphery 68 of the rotary folder after which a portion 69 of the rotary folder will engage the opposite or trailing side flap 4 to fold it forwardly over the first folded flap 1. The nose-like portion 69 of the rotary folder is formed mainly as a result of a recess or cut-out 70 in the rotary folder. The folding of the flaps 5 and 4 occurs during continued travel of the carton, the rotary member 66 rotating at such a speed that the folding nose 69 thereof moves faster than the carton so that it is enabled to fold said flap 4 forwardly in the direction in which the carton travels. Such flap 4 is folded by the nose 69 to such an extent that as the carton is carried forwardly, the leading edge of the flap 4 will pass under a stationary fin-like member 71 which completes the folding of the flap 4 and thereafter serves to hold both of the flaps 1 and 4 in their closed positions while folding of the tongued and slit flaps is effected.

Said member 71 is formed integrally with a folding shoe 72 having a bracket 73 which is bolted or otherwise secured as indicated at 74, to a bracket part 75 which is, in turn, rigidly secured to the frame structure 6. The folding shoe member 72 is an inner shoe which cooperates with an outer shoe 76. The bracket 75 is formed as an integral part of the shoe 76 so that the inner and outer shoes 75 and 76 remain stationary and in fixed position relative to each other. The shoes 72 and 76 vary in cross section from their receiving ends to their discharge ends approximately as represented in Figs. 11 to 17, the two having cooperating surface formations which act to open the slit 2 in the end flap 1 of the carton and to tuck the tongue 3 through the slit.

As shown in Fig. 12, the carton with its leading and trailing side flaps 5 and 4 folded into closed position comes into the zone of operation of the folding shoes 72 and 76 with its slit and tongued flaps 1 and 3 extending in continuation of the side walls of the carton. The slit flap 1 is slightly longer than the tongued flap 3 and engages the concave inside surface 77 of the outer folding shoe and is thereby deflected inwardly.

As the carton continues its travel, the flap 1 is further folded inwardly and the tongued flap 3 is also deflected inwardly and more or less curled toward the flap 1 which, as indicated, is folded somewhat in advance of the tongued flap 3. The inner folded 72 is provided with a ridge 78 which initially supports the slit flap 1 while a ridge 79 on the outer folder 76 engages the outside of the flap 1 and bends it toward closed position around the ridge 78.

The ridge 79 engages the slit flap just outside of the slit 2 so that the end portion of the flap 1 outwardly of the slit 2 is deflected inwardly to a somewhat greater extent than the remainder of the flap substantially as shown in Fig. 13, whereby the slit 2 is more or less opened as shown.

While the flap 1 is being thus folded and its slit 2 opened, the flap 3 is similarly being deflected inwardly and folded around a ridge 80 on the inner member, the free end portion of the tongued flap being more or less turned inwardly by the curved face 81 of the ridge 79. The ridge 79 terminates in a projecting hump 82 which more or less breaks the slit open with somewhat of a snap action which seems to work better than the gradual application of pressure to open said slit. For cooperating with the hump 82, the inner shoe is formed with a ledge 78a for supporting the extremity of the slit flap as shown in Fig. 13.

As the travel of the carton progresses, the flaps 1 and 3 come into engagement with transversely arcuate surfaces 83 and 84 and a second ridge 85 on the outer shoe 76. This ridge 83 is here shown as separated by a short gap from the ridge 79 but it may be continuous therewith. Said ridge 85 acts on both the slit and tongued flaps and is so located as to guide the end of the tongued flap 3 into the opened slit 2 as shown in Fig. 14. The ridge 85 is of sufficient length to effect curling and movement of the tongued flap 3 into and through the slit as indicated in Fig. 15. The concave portions 83 and 84 of the outer shoe 76 are then more or less merged into a substantially flat inner face 86 of the outer shoe 76 as shown by comparison of Figs. 15 and 16. The concave surface 84 is, in effect, a narrowed continuation of the entrance portion 77 on one side of the ridge 79 and the surface 83 is developed near the humped end of the ridge 79 on the other side thereof.

The recessed face 84 is brought up to the surface of the flat face 86 somewhat more abruptly than the face 83 by an area 87 (Fig. 10) so that by the time the carton progresses from the position represented in Fig. 15 to the position represented in Fig. 16, both of the flaps 1 and 2 will be approximately symmetrically folded as shown.

The inner shoe 72 terminates as indicated at 88 in Fig. 8 shortly after the position represented in Fig. 15 so that said shoe is in effect withdrawn from between the first folded flaps 4 and 5 and the slit and tongued flaps 1 and 3 to permit the latter to be directed into face to face engagement with the former. The lower portion of the outer shoe 76, that is to say, the portion which has the flat face area 86, is so curved that it is slightly eccentric to the axis of the shaft 50 about which the carton is being revolved. Said face 86 is thereby made to gradually approach the first folded flaps 4 and 5 so as to practically flatten the slit and tongued flaps in their interlocked position against the flap 4 as shown in Fig. 17. In that position, the flaps are effectively interlocked, the hooked formation of the tongue being such as to cooperate with the slit flap to prevent self-reopening of the closed end of the carton.

After leaving the outer shoe 76, the closed flaps 1 and 3 are held in closed position by means of an arcuate holding plate or bar 89 which is, in effect, an extension of the shoe having its inner face substantially concentric with the shaft 50. The carton is thereby carried to a position in which it is substantially inverted from the position in which it was received.

In this inverted position, the closed end of the carton is at the lower end and the then upper end is represented by the remaining flaps which remain in substantially coplanar relations to the respective walls from which they extend. In this inverted position with the top end of the carton open, the carton is discharged from, or withdrawn from the shoe 48.

To effect removal of the carton from the shoe 48, the hinged wall 54 thereof is first opened by the action of the cam 56 as shown in Fig. 20. At about the time the wall 54 is opened, the then leading corners of the carton are brought into engagement with a pair of continuously traveling belts 90 and 91 disposed in horizontal planes with their adjacent reaches traveling in the same direction as indicated in Fig. 20. The belts 90 and 91 are so disposed that the carton is more or less offset laterally with reference to the shoe 48 so that the belts can take hold of the carton and move it forwardly past the inwardly offset wall portions 59. The belts 90 and 91 are driven at a rate of speed which is sufficiently faster than the travel of the carton carrying shoes 48 to effect withdrawal of the cartons from the shoes while the latter continue their normal travel about the axis of the shaft 50.

The belts 90 and 91 are supported by suitable pulleys as illustrated. The pulley at one end of each of the belts 90 and 91 is a double pulley having upper and lower pulley members 92 and 93, the upper pulley 92 guiding the belt 90 or 91. Each lower pulley 93 has a belt 94 trained therearound, said belt also being directed around guide pulleys 95 and 96. The pulley 96 is carried by the lower end of a vertically disposed shaft 97 which is suitably journaled and which is driven from the driving mechanism 31. The conveyors 90 and 91 may deliver the set up cartons with one open end to any suitable receiving means including equipment for filling the carton with ice cream or other material which the carton is intended to hold. Similarly, the set up carton may be delivered to apparatus for performing other operations on the carton itself.

The described apparatus operates in a continuous manner and is quiet in operation while also being capable of very high speed operation. In certain arrangements where the machine is arranged in line with other apparatus for receiving the set up cartons, it has been found that the described apparatus delivers cartons at a higher rate than they can normally be used. A convenient means for temporarily interrupting the setting up of cartons without shutting off the machine and other units of mechanism in line with it, comprises an arrangement for preventing the feeding of collapsed cartons without at the same time stopping the operating of the feeding mechanism. The last mentioned carton feed interrupting means is shown in Figs. 2 and 3 of the drawings. It consists of a lever 98 pivotally mounted intermediate its end on an ear 99 which extends from a bracket 100 which is mounted on the top of the frame structure of the machine. Said lever 98 is weighted at one end, as indicated at 101, so as to cause that end to normally assume a down position in which a hook-like end portion 102 is spaced downwardly from and clear of the bottom of the stack of carton blanks C of the magazine.

Said lever has another arm portion extending forwardly or outwardly and it is provided with an arcuate shield 103 and a handle knob 104 whereby the hook end 102 of the arm may be moved upwardly from its normal inoperative position as shown in full lines in Fig. 3 to its operative position as shown in broken lines in said figure.

The shield 103 normally overlies a switch handle 104 which controls an electric switch in the bracket 100 for controlling the electric motor 34 which drives the machine. When the shield 103 is in its normal position as shown in full lines in Fig. 3, the switch handle 104 is protected against unintentional operation. Hence, in order to move the switch handle 104 the lever 98 must be rocked to move the shield 103 to a position in which access may be had to the switch arm. When the lever is rocked in this manner, the hook portion 102 thereof engages the bottom of the stack of cartons and moves it upwardly as indicated by dotted lines in Fig. 3 so that the lowermost carton blank is then out of reach of the gripper cups 13. Hence, although the carton feed mechanism may continue to operate, it will not feed cartons to the mechanism so long as the lever 98 is adjusted to the dotted line position illustrated in said Fig. 3. The lever 98 may be manually actuated as described or, if preferred, an electric solenoid or other suitable means may be applied to permit actuation of the lever by switch buttons placed at various convenient locations on the machine or any other equipment which is supplied with cartons by the described machine. By this arrangement the normal running of the set up machine need not be interrupted in the event that it is desired to temporarily stop the setting up of cartons for any purpose. Suitable latching means may, of course, be provided for holding the lever 98 in either or both of its adjusted positions.

The motor 34 may be suspended from a bracket 34a which is pivoted as indicated at 34b on a conveniently accessible part of the frame or bracket carried thereby so that the weight of the motor and the bracket will operate to maintain the driving belt 35 taut. The free end of the bracket 34a may be suitably guided as indicated at 34c to prevent lateral swaying if desired. Said guide means 34c may be of such character that the bracket 34a may be locked in selected position of adjustment.

The lower end of the outer folding shoe 76 may advantageously be supported by means of a link 76a connected at one end to the shoe 76 and at its other end to a conveniently accessible frame part or bracket projecting from such frame part. The link 76a may, of course, be an adjustable length link to facilitate adjustment of the lower end portion of the folding structure toward and from the carton carrying shoes 48, or, the link may be adjustably connected at either or both of its ends to the respective parts, thereby to afford a means for adjusting the position of the shoe 76 and controlling the pressure thereby applied to the carton end flaps to flatten the interlocked flaps as shown in Fig. 17. The upper end of the folding structure may, of course, also be mounted for adjustment toward and from the carton carrying shoes so as to facilitate setting of the folding structure in the most effective cooperating relationship to the carton carrying shoes.

The functioning of the folding shoe structure comprising the inner and outer members 72 and 76 is dependent to some extent on the character of material employed in making the carton blanks. The end flaps of cartons employing certain types of material may advantageously be folded by a modified folding mechanism, such as shown in Figs. 22 to 32 inclusive. In this modified mechanism the stationary folding shoe structure above described is replaced by a stationary flap holder 105, a stationary folding rod 106 and a folding shoe structure 107, the latter being secured to one end of a lever 108, which is pivotally mounted intermediate its ends and adapted to be rocked so as to shift the folding shoe structure 107 laterally during the travel of the cartons through the zone of operation of such structure.

Carton bodies are delivered to the folding shoes 48 in the same manner as above described and the leading and trailing flaps 4 and 5 are folded into closure forming position by the rotary device 66 as before.

The stationary holder 105 holds the flaps 4 and 5 in closed position as the carton is carried through its arcuate path of travel by the holder 48. The stationary rod 106 is angularly disposed (as best shown in Figs. 24 and 30) with respect to the path of travel of the cartons and it engages the outside of the slit flap 1 and folds it inwardly of the holder 105 as an incident to the travel of the carton (see Figs. 24 and 25).

The folding shoe structure 107 comprises a metal plate element 109 which is rigidly mounted on one end of the lever 108, the latter being pivotally mounted intermediate its ends as indicated at 110 on a support which is rigid with the frame 6 of the machine.

A spring 111 stretched between a portion of the arm 108 and a frame or other part of the machine serves normally to yieldingly hold the shoe carrying end of the lever in an outwardly disposed position which is determined by a stop 112 mounted on the frame 6 in such position as to engage a portion of the arm 108. A curved metal rod 113 is secured to the back of the metal shoe 109 and has a portion extending upwardly from the shoe and then downwardly and angularly across the operating front face of the shoe as best shown in Fig. 30. As shown in Figs. 25, 27, 28, 29, 31 and 32, the folding shoe 109 its rod 113 and the stationary folder and guide members 106 and 105 respectively are so arranged that the slit flap 1 will be folded inwardly over the guide 105 and bent over said guide with the rod 106 acting against a narrow tongue-like formation 2a (Fig. 23) formed at one side of the slit 2 to offset said tongue and thereby, in effect, to open the slit 2.

While the slit tongue 1 is being thus folded and the slit opened, the folding shoe 109 and folding rod 113 operate on the tongued flap 3 to fold or bend the latter around the rod 113, such folding being, of course, effected by appropriately shaping the shoe 109 to bend the flap 3 around the rod as an incident to the edgewise travel of the flap between the rod and the shoe. The action is quite similar to that described above in respect of the cooperating folding shoes 72 and 76.

The curling of the tongued flap 3 around the rod 113 may or may not be accompanied by some folding of the tongue about its hinge connection with the wall of the carton body from which it extends.

During at least the latter part of the movement of the carton through the zone of operation of the shoe 109 and rod 113, said shoe and rod are moved laterally as an incident to rocking of the lever 108 and such lateral shifting of the shoe and rod serves to produce a definite folding of the tongued flap 3 on its hinge line so as to effect positive insertion of the tongue into and through the slit 2 of the flap 1 as shown in Fig. 31. Rocking of the shoe carrying lever 108 inwardly of the end of the carton body and against the tension of the spring 111 is effected by a cam bar 114 which is carried by the side of each carton carrying member 48, such cam bar being appropriately shaped to engage and move the lever in the desired timed relationship when the tongued flap 3 has been curled to a position in which the tongue may be most advantageously passed through the slit. The movement imparted to the arm 108 may be gradual throughout the entire time period during which the shoe 109 and rod 113 are acting on the tongued flap or it may be effective during only a terminal portion of that period. Similarly the movement may be effected during most of that period and it may be somewhat accelerated toward the latter portion when the tongue is to be moved through the slit from the position shown in Fig. 28 to the position shown in Fig. 31. Such pronounced or accelerated movement during the tongue inserting period may be advantageous especially with cartons made of relatively stiff paperboard.

The lower end of the shoe 109 may be provided with a flap portion 115 which will press the flaps 1 and 3 to substantially flap condition as shown in Fig. 32 and an auxiliary presser for this purpose may be provided in the form of a compressing plate 116 (Fig. 22) suitably mounted on the frame structure and more or less corresponding in flap pressing and guiding function to the extension 89 of the folding shoe structure shown in Fig. 2. This pressing member 116 should, of course, be continuous like the member 89 to hold the flaps in their closed position until the carton is to be discharged from the carrying shoe 48 in the manner already explained.

Various other changes and modifications may be embodied in the described structure while retaining the principles thereof.

I claim:

1. Apparatus for withdrawing collapsed tubular carton bodies from a magazine and distending the same, comprising a vacuum gripper adapted to engage and grip a wall of the carton body in the magazine, means for effecting movement of said gripper away from the magazine in a direction substantially normal to the plane of the engaged carton body wall to thereby withdraw the engaged body facewise from the magazine, a guide disposed substantially in co-planar relation to the path of travel of an edge of the carton body withdrawn from the magazine by said gripper, and means for shifting said gripper laterally toward said guide during its carton body withdrawing movement to thereby effect opening of the carton body.

2. Apparatus according to claim 1, wherein said vacuum gripper is carried by a parallel motion mechanism which is mounted for pivotal movement on an axis extending in the direction in which said gripper is moved laterally, said gripper being rocked about said axis to effect said withdrawal of the carton body from the magazine, and wherein there is provided means for shifting said parallel motion mechanism as an incident to pivotal movement thereof about said pivot axis, thereby to effect said lateral shifting of the gripper towards said guide.

3. Apparatus according to claim 1, wherein the gripper comprises a rod-like member, an arm having one end provided with means rotatably supporting said rod-like member, a shaft pivotally supporting the other end of said arm for rocking movement about the axis of said shaft, a bracket supporting said shaft for rotation about its own axis, means pivotally mounting said bracket for rocking movement about an axis extending transversely of said shaft axis, means for effecting rocking movement of said bracket about its pivot mounting and thereby effecting rocking movement of said gripper rod and grippers to effect withdrawal of the carton bodies from the magazine, and means for effecting rocking of said shaft about its own axis as an incident to the pivotal movement thereof with said bracket, thereby to effect rocking of said gripper rod carrying arms and said gripper rod laterally towards said guide to effect opening of the carton bodies as aforesaid.

4. In apparatus of the class described, an arm mounted for rotation and having a shoe at its free end for receiving therein a distended rectangular tubular carton body having flaps extending from an end thereof and adapted to be folded over the end of the body to close the same, means for effecting rotation of said arm, said shoe having an open outer end remote from the axis of rotation of the shoe and an open front side, means for delivering a distended carton body through said open front side into said shoe with the flaps of the carton projecting from said shoe through said open outer end thereof, means acting on said flaps during the travel thereof in said shoe to fold said flaps into end closure forming position over the end of the container body, and means for receiving the closed end carton from said shoe and carrying the carton in continuation of its travel out of the normal path of travel of said shoe.

5. Apparatus of the class described having an arm mounted for rotation and having a shoe at its free end for receiving and propelling a distended rectangular tubular carton body through an arcuate path of travel and which carton body is provided with end flaps which are folded over the end of the body to close the same during the travel of said body as aforesaid, and means for receiving the closed end carton from said shoe and carrying the carton in continuation of its travel in said shoe out of the normal path of travel of said shoe, said carton receiving and carrying means comprising a pair of conveyor belts arranged on opposite sides of the path of travel of said carton for engaging opposite side portions thereof adjacent the closed end of the carton, said closed end portion of the carton projecting from said shoe sufficiently to permit engagement thereof by said conveyor belts as aforesaid, and means driving said belts at a speed of travel which is sufficient to effect withdrawal of the carton body from the carrying shoe and to move the carton body out of the path of travel of the shoe while the latter maintains its normal rate of travel.

6. Apparatus of the class described having an arm mounted for rotation and having a shoe at its free end for receiving and propelling a distended rectangular tubular carton body through an arcuate path of travel and which carton body is provided with end flaps which are folded over the end of the body to close the same during the travel of said body as aforesaid, and means for receiving the closed end carton from said shoe and carrying the carton in continuation of its travel in said shoe out of the normal path of travel of said shoe, said shoe embodying a back wall and a pair of side walls extending forwardly therefrom, one of said side walls being hinged to said back wall so as to be adapted to be moved toward the other side wall to grip a carton body and away from said other side wall to release the carton body, and means for effecting movement of said hinged wall away from said other side wall as an incident to the travel of the shoe to facilitate delivery of the closed end carton body to said receiving means.

7. In apparatus of the class described, means for propelling a carton body including flaps which project from the side walls of the carton through an arcuate path of travel, means adjacent said path of travel for engaging said flaps and operative to fold said flaps into end wall forming position over the end of said carton, said folding means comprising a fixedly mounted guide member for deflecting one of said flaps inwardly as an incident to the travel of the carton, a folding shoe mounted for movement transversely of the direction of travel of the carton for folding the other of said flaps inwardly to closure forming position, and means carried by said carton propelling means for effecting movement of said folder transversely of the travel of the carton.

8. In apparatus of the class described, a carton carrier for propelling a tubular carton body including tongued and slit flaps which project respectively from the side walls of the carton body through an arcuate path of travel, and means for folding said tongued and slit flaps into end wall forming position over the end of the carton body, said flap folding means comprising a stationary guide rod extending in the direction of travel of the carton and also transversely thereof, said guide rod being arranged to engage the slit flap and to fold the same inwardly over the end area of the carton body, and a folding shoe movable transversely of the path of travel of the carton body and having an arcuate surface formation and a mandrel rod fixedly associated therewith and arranged to receive the tongued flap between them and to bend said tongued flap around said mandrel rod as an incident to the travel of the carton and said tongued flap between said arcuate surface and mandrel rod, and means for moving said shoe transversely of said path of travel of the carton to thereby effect folding of said tongued flap supplemental to the folding thereof effected as an incident to the travel of the flap between said arcuate surface and mandrel rod, the arrangement being such that the tongued flap is bent so as to direct its free end into said slit as an incident to said movement of said shoe, said guide rod serving to engage said slit tongue adjacent the slit thereon to thereby effect opening of the slit preliminary to the insertion of the tongue into said slit.

9. Apparatus for folding to end closing position, flaps which project from opposite sides of a carton body, comprising a shoe for receiving the carton body in distended condition with said flaps projecting from said body, means for effecting travel of said shoe with a carton body therein through an arcuate path of travel and with said flaps projecting from the side walls of said carton body, and flap folding means comprising stationary inner and outer folders fixedly mounted in spaced relation so as to be operative to receive between them the opposite side wall flaps of the carton body being carried by said shoe, said folders being elongated in the direction of travel of the carton bodies and curved lengthwise to an eccentric relationship to the arcuate path of travel of said bodies, the inner folder being provided with a pair of ridges elongated in the direction of travel of the carton bodies and spaced transversely thereof, and said outer folder being provided with a ridge extending lengthwise thereof intermediate its side edges and with transversely concave surfaces on opposite sides of said ridge, said concave surfaces and ridge being operative to effect inward folding of said side wall flaps and bending of the same over said ridges of the inner member as an incident to travel of the flaps between said inner and outer folders.

10. Apparatus for folding to end closing position and interlocking tongued and slitted flaps which project at one end of a carton body, respectively from the walls of a mutually opposed pair of the carton body walls, comprising means for propelling such carton body through an arcuate path of travel with the flap carrying end of the carton body disposed at the outside of said arcuate path of travel, means acting on said flaps during the travel of the carton body as aforesaid to fold said flaps into end closure forming position over the adjacent end of the carton body, said end flap folding means comprising cooperating inner and outer stationary members elongated in the direction of travel of the carton body and arched to an eccentric relationship to the arcuate path of travel of the body, said inner and outer members being normally fixedly mounted in relatively spaced relation to receive between them said flaps and provided with cooperating surface formations which are operative to fold said flaps inwardly over the end area of the carton body, said inner member having transversely spaced, longitudinally extending portions arranged to be engageable by portions of the slitted flap on opposite sides of the slit therein and said outer member having a longitudinally extending ridge formation engageable with said slitted flap adjacent to but at one side of the slit therein and intermediate said transversely spaced portions of said inner member so as to press the engaged flap portion to an offset relation to the flap portion on the other side of the slit, thereby to open said slit, and said outer member also being provided with means for acting on the tongued flap to effect insertion of the tongue portion thereof into said slit after opening thereof as aforesaid.

11. Apparatus for folding to end closing position and interlocking tongued and slitted flaps which project at one end of a carton body, respectively from the walls of a mutually opposed pair of the carton body walls, comprising means for propelling such carton body through an arcuate path of travel with the flap carrying end of the carton body disposed at the outside of said arcuate path of travel, means acting on said flaps during the travel of the carton body as aforesaid to fold said flaps into end closure forming position over the adjacent end of the carton body, said end flap folding means comprising cooperating inner and outer stationary members elongated in the direction of travel of the carton body and arched to an eccentric relationship to the arcuate path of travel of the body, said inner and outer members being normally fixedly mounted in relatively spaced relation to receive between them said flaps and provided with cooperating surface formations which are operative to fold said flaps inwardly over the end area of the carton body, said inner member having transversely spaced, longitudinally extending portions arranged to be engageable by portions of the slitted flap on opposite sides of the slit therein and said outer member having a longitudinally extending ridge formation engageable with said slitted flap adjacent to but at one side of the slit therein and intermediate said transversely spaced portions of said inner member so as to press the engaged flap portion to an offset relation to the flap portion on the other side of the slit, thereby to open said slit, said slit-opening ridge formation being of short length in the direction of movement of the carton body and projecting sharply toward said inner member so as to apply a shock force thereto, thereby to break any bonds remaining in the slit, whereby complete opening of the slit is obtained notwithstanding imperfect cutting thereof, and said outer member also being provided with means for acting on the tongued flap to effect insertion of the tongue portion thereof into said slit after opening thereof as aforesaid.

12. Apparatus of the class described, means for propelling a carton body through an arcuate path of travel, and stationary folding means disposed adjacent said path of travel for acting on slitted and tongued flaps which project respectively from ends of opposite side walls of the carton to fold said flaps to end closure position over the end of the carton as an incident to the travel of the carton, said folding means comprising inner and outer members having a passageway between them through which said flaps are adapted to pass during the travel of the carton, the outer member having a pair of transversely arcuate surfaces arranged eccentrically to the path of travel of said carton for respectively engaging said carton flaps and folding the same inwardly over the end area of the carton, said members having cooperating means which act on the slitted flap to offset the inner member from the normal plane of the flap, the free outer portion of the flap on one side of the slit therein so as to preliminarily open said slit, the arcuate surface portion of said outer member which engages said tongued flap being provided with an inwardly directed portion operative to cause the free end of the tongue to move endwise toward said offset outer end portion of the slitted flap and into and through said slit, said outer member also having a surface formation extending from said arcuate surface and shaped to complete the movement of said tongue through said slit and to flatten said flaps to endwall condition over the end of the carton.

13. Apparatus for setting up substantially rectangular cartons having tubular bodies and end flaps extending from the walls of said bodies at one end thereof, comprising a continuously rotated carrier provided with an open sided shoe for receiving distended carton bodies, a magazine for holding a stack of said tubular bodies collapsed to flat condition with the respective end flaps extending endwise in coplanar relation to the respective walls of the body, pivotally mounted means for successively withdrawing the carton bodies from said magazine, means cooperating with said withdrawing means to distend said carton bodies as an incident to the withdrawal movement thereof, said withdrawing means and said carrier being actuated in opposite directions about their respective pivot axes for respectively withdrawing and carrying said carton bodies in opposite directions, said withdrawing means being operative to deliver a distended carton into the path of travel of said open sided carrier shoe while the latter continues to rotate as aforesaid, and means operative as an incident to the travel of the carton body in said shoe for folding flaps which extend from walls of said carton body into closure forming position over the end of said body.

14. Apparatus according to claim 13, having vacuum cup carton body gripping means for withdrawing the carton bodies from the magazine, and a vacuum pump actuated in predetermined synchronization with the movements of said gripping means to effect pneumatic gripping and holding of the carton bodies during the movement thereof from the magazine to the rotating carrier and release of said bodies upon delivery thereof to said rotating carrier.

15. Apparatus of the class described, comprising a magazine for holding a stack of collapsed carton bodies which have four side wall panels hingedly united so as to be distendable into tubular bodies, means for gripping one of the wall panels of a carton body in said magazine, means for imparting to said gripping means movement components whereby said gripped panel is pulled facewise out of said magazine and moved edgewise to withdraw the carton body from said magazine and to distend said body, and a guide plate adjacent the side of the path of travel of said gripping means toward which said gripper moves to effect said edgewise movement of said gripped panel, said guide plate constituting an abutment engageable by a portion of said carton body to prevent the same from being moved bodily as an incident to said edgewise movement of said panel, whereby the carton body is distended as an incident to said edgewise movement.

16. Apparatus for folding to end closing position, flaps which project from opposite sides of a carton body and for inserting a tongue which projects from one of said flaps into a slit provided in the other thereof, comprising means for propelling the carton body in distended condition through an arcuate path of travel with said flaps initially projecting from opposite sides of said body at one end thereof, flap folding means comprising stationary inner and outer folders fixedly mounted in spaced relation to each other and elongated and curved in the direction of travel of said carton body so as to be operative to receive between them and to fold into mutually overlapping relationship said opposite side wall flaps of the carton body as an incident to the travel thereof as aforesaid, one of said folders being provided with a pair of ridges spaced transversely of and elongated in the direction of travel of the carton bodies, the other of said folders being provided with transversely concave surfaces respectively disposed opposite to said ridges for guiding the respective flaps inwardly over said ridges, the folder having said pair of ridges being also provided with a ledge spaced from the one of said ridges over which the slitted flap is guided inwardly, said ledge being positioned to support the free end of said slitted flap when the latter is guided to inwardly extending position as aforesaid, and said other folder being provided with a pair of ridge portions respectively operable to act against the slitted flap when supported by said ledge to bend the flap to open the slit thereon, and to provide, in effect, a continuation of one of said arcuate surfaces for continuing the inward movement of the tongued flap to effect insertion of its tongue into said opened slit.

References Cited in the file of this patent

UNITED STATES PATENTS

| Number | Name | Date |
|---|---|---|
| 711,119 | Pennock | Oct. 14, 1902 |
| 1,593,827 | Howard | July 22, 1926 |
| 1,765,718 | Everett | June 24, 1930 |
| 1,861,605 | Maass | June 7, 1932 |
| 1,991,223 | Ledig et al. | Feb. 12, 1935 |
| 2,016,814 | Ferguson | Oct. 8, 1935 |
| 2,082,086 | Vergobbi | June 1, 1937 |
| 2,134,418 | Rose | Oct. 25, 1938 |
| 2,171,131 | Milmoe | Aug. 29, 1939 |
| 2,217,784 | Bennett | Oct. 15, 1940 |
| 2,241,817 | Howard | May 13, 1941 |
| 2,291,010 | Vergobbi | July 28, 1942 |
| 2,314,434 | Toelke | Mar. 23, 1943 |
| 2,357,535 | Monroe | Sept. 5, 1944 |
| 2,399,934 | Monroe | May 7, 1946 |
| 2,521,996 | Ray | Sept. 12, 1950 |
| 2,573,324 | Ferguson | Oct. 30, 1951 |